Feb. 19, 1952 A. ROSE 2,586,482

PICKUP TUBE FOR COLOR TELEVISION

Filed Nov. 20, 1947

INVENTOR
Albert Rose
BY Olin C. Mitchell
ATTORNEY

Patented Feb. 19, 1952

2,586,482

UNITED STATES PATENT OFFICE 2,586,482

PICKUP TUBE FOR COLOR TELEVISION

Albert Rose, Princeton, N. J., assignor to Radio Corporation of America, a corporation of Delaware Application November 20, 1947, Serial No. 787,212

7 Claims. (Cl. 178—5.4)

Figures 1, 2:
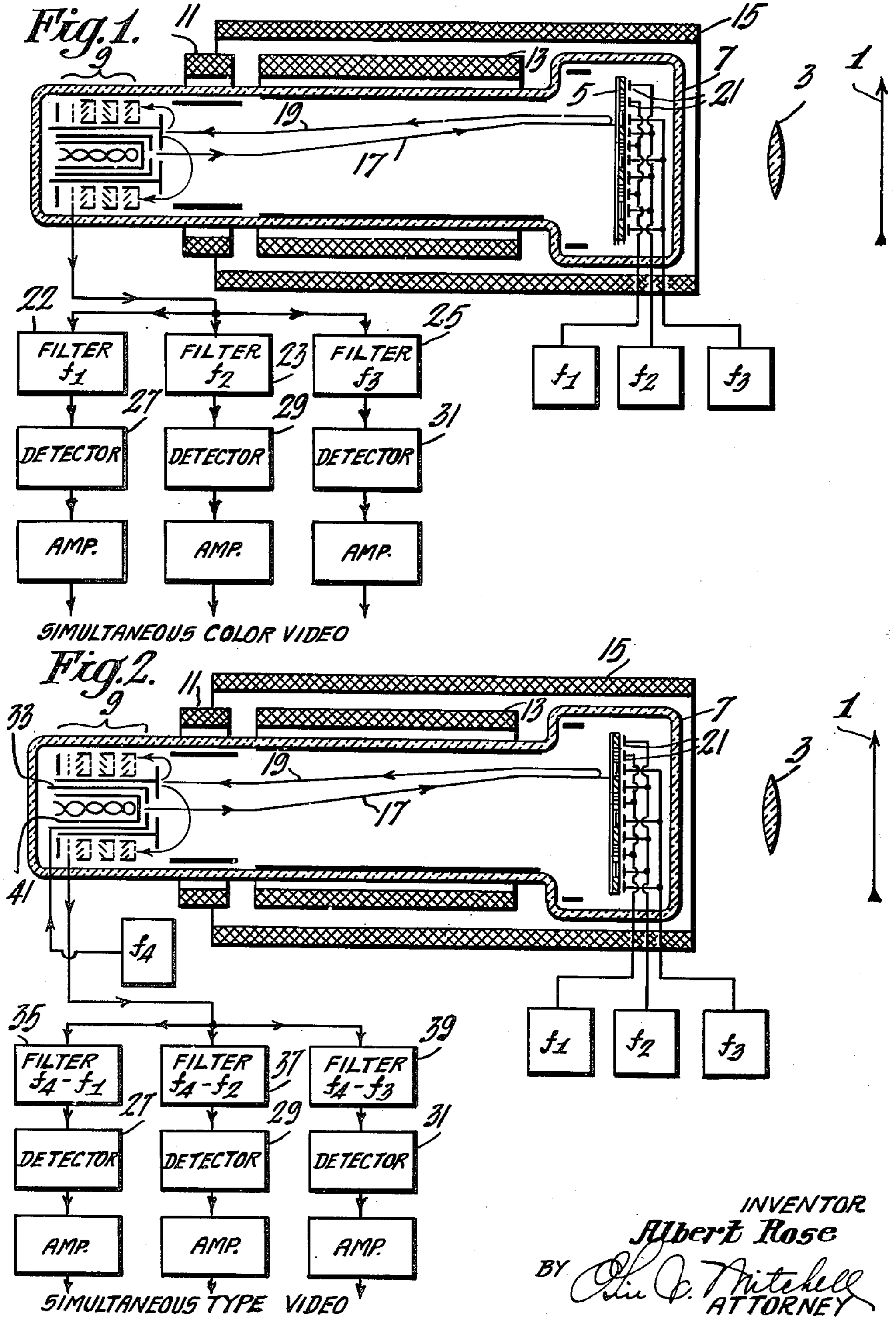

This invention relates to color television, and more particularly to a simultaneous type color television pickup system involving a single camera tube.

The reproduction of images in substantially their natural color with electronic devices can be accomplished by the well known additive methods wherein light from an object is broken down into a predetermined number of selected component color images which are then superimposed in registry at remote locations. In the employment of additive methods for the transmission of television images, it is necessary that not only the image be divided into its selected component colors, but it must also be divided into its image elements in order to derive therefrom a video signal train by a predetermined orderly sequence of scanning.

It has been proposed to develop image signals representative of each selected component color of an object by the employment of independent camera tubes, each of which is sensitive to a different selected component color image than the other. Although such an arrangement has proved highly satisfactory for the development of images in substantially their natural color at locations remote from the original object or image, there are certain problems of registry involved which must be overcome and which necessitate a careful adjustment and generally complicated and involved equipment.

It is quite well known in the printing art that image likenesses can be developed not only by a reproduction of independent small size picture elements indistinguishable to the unaided human eye at normal viewing distances, but that images in color can be developed by dividing each elemental area of the color image in separate and distinct color sub-elements, the magnitude of each color sub-element dependent upon the magnitude of the individual color component contained in the elemental area of the image.

It therefore follows that an electrical representation of an image in substantially its natural color may be developed by not only dividing it into elemental areas for the purposes of brilliancy determination, but dividing the elemental areas of the image into sub-elemental areas wherein each sub-elemental area of the element represents in proper magnitude an individual component color for that particular elemental area.

According to this invention, a color television image pickup arrangement is provided by employing an image pickup tube or device having a plurality of different component color responsive and electrically modulatable electrodes. A signal channel for each selected component color is connected to the image pickup tube, and each of the signal channels is made responsive to only a predetermined range of frequencies. Each of the color responsive electrodes are then electrically modulated with an auxiliary signal whose frequency corresponds to the frequency response of the designated component color channel so that the signal channels provide intelligence relating only to their designated component color image.

A primary object of this invention is to provide an improved color television system.

Other and incidental objects of the invention will be apparent to those skilled in the art from a reading of the following specification and an inspection of the accompanying drawing in which Figure 1 illustrates by block diagram one form of this invention; and Figure 2 shown also in block diagram shows another form of this invention.

Turning now in more detail to Figure 1, there is shown a colored object represented by arrow 1, whose image is projected through lens 3 onto a target 5 of an image pickup tube 7, which, for the purpose of illustration, takes the form of an Orthicon with an electron multiplier 9 for signal amplification.

The tube 7 includes the required aligning coil 11, deflection coil 13 and focusing coil 15.

Although the theory of operation of the Orthicon and other image pickup device is quite well known in the television art, it may be well, for the purpose of explanation of this invention, to here explain briefly its theory of operation.

The popular storage type image pickup tubes usually include an electron gun for developing an electron stream, a photosensitive insulated surface, and a deflecting element to cause the electron beam to scan the target in an orderly sequence of scanning. The scene or image to be transmitted is focused on the target and causes to be built up by photo emission an electrical charge pattern corresponding to the light and shade in the image. As the scanning beam, which is a constant stream of electrons, approaches the target, some of the electrons thereof are "absorbed" by the target electrode in accordance with the charge image and the reflected or returned stream of electrons which leaves the vicinity of the target is accordingly modulated by the charge pattern.

The modulation of the return beam can either be collected by a signal plate located close to the target surface, which picks up the modulation by capacitances and feeds it to the control electrode of the associated amplifier tube, or the return beam modulation can be utilized by collecting the return beam on a collector element properly positioned in the tube, which is attached to an amplifier or an electron multiplier.

In the form of the invention illustrated in Figure 1 and described below, the modulation is picked up from the return beam in order to permit efficient control by electrical modulation of sub-elemental areas of the target.

Referring again to Figure 1, the electron beam 17, upon approach to the target 5, is returned as a return beam 19. The amount of electrons in the return beam 19 is determined in one sense by the electric charge pattern at electrode 5 caused by the light image of object 1. The amount of electrons or magnitude of return beam 19 is also determined by the auxiliary potential which is placed upon the target 5 by conductors 21. This will be readily understood when it is appreciated that conductors 21 are capacitively coupled to target 5 and cause an electrical effect similar to that of the charge pattern caused by photo emission resulting from the optical image of object 1.

The return beam 19 has impressed on it by subtraction the same video signal that an amplifier would receive if connected to the target. The significant difference is that an amplifier lead connected to a collector for the return beam receives the full beam current minus the video signal. Any slight variations in beam current, such as a modulation of the beam 17, are received by the amplifier connected in the tube output circuit.

In the low velocity type of scanning tube, such as the Orthicon, the return beam 19 is modulated by the carrier frequencies $f_1$, $f_2$ and $f_3$ only when the corresponding target areas have positive charges on them. That is, when no light falls on the tube, the return beam is not modulated by the carrier frequencies.

If a modulation frequency $f_1$ is applied to one or more conductors 21, the return beam 19 will be modulated at frequency $f_1$ as it traverses the area of target 5 opposite the modulated conductors 21. If, in addition to modulating conductors 21, there is associated with the modulated conductors 21 a color filter, for example, of one selected component color so that the area of target 5 adjacent the modulated conductors 21 contains an electrical charge representative of only one color component of the image of object 1, the modulated beam 19 contains brilliance information of the sub-element corresponding to the selected component color of the associated color filter sub-element. It will be seen that if one of the selected component colors is represented in each elemental area of the image or target 5, a complete component color image signal may be developed by a scanning of target 5.

If, however, another group of conductors 21 having another selected component color filter associated therewith is modulated by a second frequency $f_2$, the return beam 19 will contain brilliance information of the second selected component color, in addition to its modulation at frequency $f_2$ when traversing conductors 21 associated with the second selected component color filters. The same is true with a third group of conductors 21 modulated at a third frequency $f_3$.

Scanning of a multiple element target of this nature will produce in the output circuit of the tube 3 separate carrier frequencies $f_1$, $f_2$ and $f_3$, modulated by an amount dependent upon the component color light intensities on the target 5.

The three modulated carriers are to be separated, as indicated, through a filter 22 responsive to frequency $f_1$ and its associated side bands, filter 23 responsive to frequency $f_2$ and its associated side bands, and filter 25 responsive to frequency $f_3$ and its associated side bands.

The output of filter 22, 23 and 25 is fed to detectors 27, 29 and 31, which produce for their corresponding amplifiers a video signal for each selected component color. The video signal may be then utilized for simultaneous transmission.

Turning now to Figure 2, there is shown another form of this invention in block diagram. Like numbers refer to like elements throughout the two figures of the drawing.

The operation of the form of the invention shown in Figure 2 is very much like the operation of the invention shown and described under Figure 1 above, except for the fact that the scanning electron beam 17 is modulated at a frequency $f_4$ by the control electrode 33 of the electron gun.

It will be seen after a brief reference to the explanation of the operation of the form of the invention shown in Figure 1 above that the return beam 19 of Figure 2, when scanning the conductors 21 of target 5 which are modulated with a carrier signal whose frequency is $f_1$, will include not only a modulation caused by the electrical charge pattern of the optical image on target 5, but will also include a modulation resulting from the combination of the frequency $f_1$ applied to conductors 21 and frequency $f_4$, which was applied to the beam 17. The combination of frequency $f_1$ and $f_4$ will result in a single frequency equal to the difference (or sum) of frequency $f_1$ and frequency $f_4$. If frequency $f_4$ is chosen to be higher than frequency $f_1$, the difference frequency will be equal to $f_4$—$f_1$. The same will apply to conductors 21 modulated with frequencies $f_2$ and $f_3$.

Video signals representative of the separate selected component colors may therefore be isolated by employing filters whose frequency response is, for example, the difference between frequency $f_4$ and the frequencies $f_1$, $f_2$ and $f_3$. Therefore, filter 35 is provided for one channel having a frequency of response equal to frequency $f_4$—$f_1$. Filter 37 is provided for another channel having a frequency response equal to frequency $f_4$—$f_2$. Filter 39 is provided having a frequency response equal to frequency $f_4$—$f_3$. Obviously, each filter must pass not only the particular difference frequency, but also the side bands associated therewith in accordance with the video modulations of the return cathode ray beam. The channels including detector 27, detector 29 and detector 31, therefore, each contain video signals representative of one different selected component color.

The frequency $f_4$ may be applied to the control electrode 33 as shown, or it may be applied to the cathode 41. It may also be applied to both the control electrode 33 and the cathode 41, or to the several conductors 21 in combination with frequencies $f_1$, $f_2$ and $f_3$.

In the arrangement shown and described, resolution does not depend on registration, and purity of color does not depend on the fineness of focus of the scanning beam.

Having thus described the invention, what is claimed is:

1. A color television transmitting system comprising an image pickup tube of the type in which image signals of different selected component color representations are developed by scanning different selected component color sensitive electrode elements, a signal channel for each signal representative of a different selected component color, each of said signal channels including a frequency filter responsive only to one of a plurality of different carrier frequencies and its associated side bands, a carrier signal source of each of said different carrier frequencies, and connections between each of said carrier signal sources and their corresponding color sensitive electrode elements.

2. A color television transmitting system comprising an image pickup tube of the type in which the component color representations of image signals are developed by scanning different selected component color representative electrode elements, a signal channel for each signal representative of each selected component color, said signal channel being adapted to pass only one of a plurality different frequency ranges, a source of component color designated carrier signals for each of said different frequency ranges, and connections between each of said component color designated carrier signal sources and their corresponding color representative electrode elements.

3. A color television transmitting system comprising an image pickup tube of the type in which the component color representations of the developed image signals are electrically modulatable, said image pickup tube having a modulation carrier signal input circuit for each selected component color and a signal output circuit, a signal channel for each of said selected component colors, each of said signal channels responsive only to a different frequency range, a source of component color designated carrier signals for each of said different frequency ranges, connections between each of said component color designated carrier signal sources and the corresponding color designated signal channel, and connections between each of said carrier signal sources and the corresponding color designated carrier signal input circuit of said image pickup tube.

4. A color television transmitting system comprising an image pickup tube of the type in which each of the component color representations of the developed image signals are independently electrically modulatable, said image pickup tube having an output circuit, a signal channel for each of said selected component colors, each of said signal channels responsive only to a different signal frequency range, a source of component color designated carrier signals in each of said different frequency ranges, connections between each of said carrier signal sources and the corresponding color designated signal channel, and connections between each of said color designated carrier signal sources and the corresponding color designated carrier signal input circuit of said image pickup tube.

5. A color television transmitting system comprising an image pickup tube having a plurality of different component color responsive electrically modulatable electrodes, said image pickup tube having an output circuit, a signal channel for each of said selected component colors connected to said image pickup tube output circuit, each of said signal channels responsive only to a different frequency range, a source of component color designated carrier signals for each of said different frequency ranges, connections between each of said carrier signal sources and the corresponding color designated signal channel, and connections between each of said color designated carrier signal sources and the corresponding color responsive electrically modulatable electrodes.

6. A color television transmitting system comprising an image pickup tube having a plurality of different component color responsive electrically modulatable electrodes and a scanning beam intensity control electrode, said image pickup tube having an output circuit, a signal channel for each of said selected component colors connected to said image pickup tube output circuit, each of said signal channels responsive only to a different frequency range, a source of component color designated carrier signals for each of said different frequency ranges, connections between each of said carrier signal sources and the corresponding color designated signal channel, connections between each of said color designated carrier signal sources and the corresponding color responsive electrically modulatable electrodes, a source of control carrier signals, and a connection between said source of control carrier signals and said scanning beam intensity control electrode.

7. A color television transmitting system comprising an image pickup tube having a plurality of different component color responsive electrically modulatable electrodes and a scanning beam intensity control electrode, said image pickup tube having an output circuit, a signal channel for each of said selected component colors connected to said image tube output circuit, each of said signal channels responsive only to a different frequency range, a source of component color designated carrier signals for each of said different frequency ranges, connections between each of said carrier signal sources and the corresponding color designated signal channel, connections between each of said color designated carrier signal sources and the corresponding color responsive electrically modulatable electrodes, a source of control carrier signals, a connection between said sources of control carrier signals and said scanning beam intensity control electrode, and wherein the frequency response of said color designated signal channels includes the difference between the frequency of said control carrier source and the respective color designated carrier signal sources.

ALBERT ROSE.

REFERENCES CITED

The following references are of record in the file of this patent:

UNITED STATES PATENTS

| Number | Name | Date |
|---|---|---|
| 2,253,292 | Goldsmith | Aug. 19, 1941 |
| 2,294,820 | Wilson | Sept. 1, 1942 |
| 2,296,908 | Crosby | Sept. 29, 1942 |
| 2,307,188 | Bedford | Jan. 5, 1943 |
| 2,309,506 | Herbst | Jan. 26, 1943 |
| 2,335,180 | Goldsmith | Nov. 23, 1943 |
| 2,438,269 | Buckbee | Mar. 23, 1948 |
| 2,446,249 | Schroeder | Aug. 3, 1948 |
| 2,461,515 | Bronwell | Feb. 16, 1949 |
| 2,479,820 | De Vore | Aug. 23, 1949 |